March 28, 1933. J. ZUBATY 1,902,932
INSTRUMENT MOUNTING
Filed Aug. 23, 1929
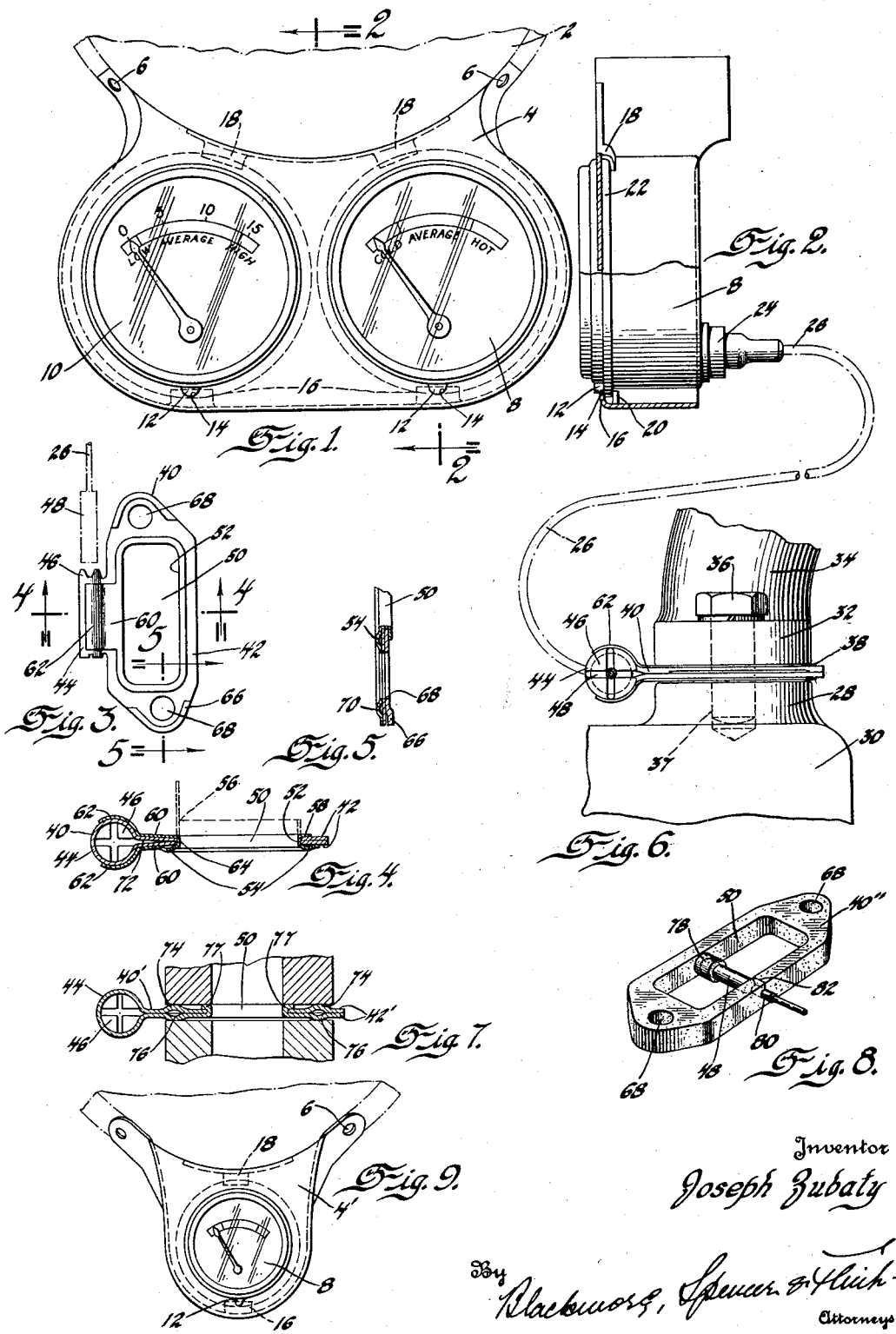
Inventor
Joseph Zubaty
By Blackmore, Spencer & Hulh
Attorneys Patented Mar. 28, 1933

1,902,932

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

INSTRUMENT MOUNTING

Application filed August 23, 1929. Serial No. 387,966.

This invention relates to temperature indicating systems and has particular reference to a means for indicating the temperature of internal combustion engines used on automotive vehicles.

In modern automotive vehicles, the thermometer or gauge for indicating the temperature of the engine (or its cooling system) is mounted at the instrument board and the heat of the engine transmitted to the thermometer or gauge in various ways, such as the means of an easily expansible heat sensitive fluid.

It is an object of the present invention to devise a new means for mounting the bulb containing the heat sensitive fluid which bulb is suitably interconnected with a gauge mounted at the instrument board. The invention is readily adaptable to engines of vehicles which were not equipped with a heat indicator at the factory, or it may be applied with equal facility during the assembly of the engine on the chassis at the factory.

The object of the invention is accomplished by placing a bulb holder at a joint of the water circulating system of the engine, preferably between the engine block and the upper tank of the radiator where the conduit joins onto the engine block. Any other joint of the system may be used and the one indicated, although preferred, is illustrative only.

The object of the invention is accomplished by placing a hinge-like adapter at the joint and leaving a circular extension on the adapter outside the joint. The circular extension has integral fingers on both ends which are bent over to retain a thermostatic bulb therein. The adapter is provided with a flow opening corresponding to the flow conduit of the water circulating system and around the edge of the water opening of the adapter an annular hinge-like member is applied. The annular member has a bead formed thereon and its edges folded over the edges of the opening. Extensions on the annular member fit over the cylindrical extension on the adapter and aid in transmitting heat to the thermostatic bulb. The adapter is provided with suitable bolt-receiving openings to accommodate the bolts for fastening the joint fitting to the engine block and beads are provided on the adapter at the bolt openings. The adapter also forms a gasket and eliminates the usual gasket placed at the joint.

As a modification of the invention the leaves of the hinge-like adapter may be directly provided with beads and one of the edges of the gasket at the water opening is folded over the second edge, thus eliminating the annular member.

As a second modification of the invention, the adapter may be formed of rubber and provided with an internal boss to receive one end of the thermostatic bulb. The portion of the gasket opposite the boss is provided with an opening and a cut or slit to permit the insertion of the second end of the bulb. In this species, the bulb is brought into direct contact with the water in the circulating system.

The invention also relates to certain improvements in the mounting of instruments on instrument boards of automotive vehicles. An auxiliary instrument panel is provided which is adapted to be attached to existing panels and to receive one or more instruments, one of which may be the gauge for indicating the temperature of water circulating systems. The bulb mounted in the adapter may be connected to the temperature indicator by a suitable tubing to permit the heat sensitive fluid to expand and through its expansion indicate the temperature on the gauge mounted in the auxiliary instrument panel.

On the drawing:

Figure 1 is a front view of the auxiliary instrument panel applied to the conventional panel of an automotive vehicle.

Figure 2 is a section on the line 2—2 of Figure 1.

Figure 3 is a plan view of the adapter of the invention.

Figures 4 and 5 are sections on the lines 4—4 and 5—5 of Figure 3.

Figure 6 is a view of a portion of an internal combustion engine showing the application of the adapter of Figures 3 to 5 inclusive.

Figures 7 and 8 are sectional and perspective views, respectively, of modified forms of adapters.

Figure 9 is a view similar to Figure 1 of a modified form of auxiliary instrument panel.

Referring to the drawing, the numeral 2 indicates the instrument panel of an automotive vehicle. On the panel 2 there is adapted to be mounted the auxiliary panel indicated as a whole at 4. The auxiliary panel 4 is secured by suitable fastening means passing through the openings indicated at 6 in both panel 2 and auxiliary panel 4.

The auxiliary panel 4 is provided with suitable openings, in the present instance, two, to receive the instruments 8 and 10. The lower portion of each instrument is provided with the tongue 12 received in the recess 14 at the lower portion 16 of the instrument openings. The tongue 12 and groove 14 serve as a means to position the instruments 8 and 10. Suitable tongues 18 formed in the panel 4 at its upper portion and tongues 20 formed in panel 4 at its lower portion are bent over onto the rib or annular flange 22 of the instruments 8 and 10 to rigidly hold them in place.

The modification in Figure 9 distinguishes from the principal showing in Figure 1 in that the auxiliary instrument panel 4' is adapted to receive but a single instrument 8 or 10.

Each instrument has the rearwardly extending stud or socket portion 24 adapted to receive one end of a suitable tube or pipe 26 which may transmit either oil pressure or the force of expansion of a heat sensitive fluid to indicate water temperature.

The adapter of the invention is shown in Figure 6 as applied to the water outlet 28 of an internal combustion engine 30. To the water outlet 28 there is secured the fitting 32 of the conduit 34 which is adapted to pass the water from the engine to the upper tank of the usual radiator. The radiator and tank are conventional and are therefore not illustrated. The fitting 32 is adapted to be secured to the outlet 28 by means of bolts 36 passing through ears or flanges at either of its sides and into suitably threaded openings 37 formed at the water outlet 28. At the joint 38 between the outlet 28 and the fitting 32 the adapter 40 of the invention is applied.

The adapter 40 comprises the hinge-like element including the flat portions 42 on one side, which extension 44 at one side, which extension projects beyond the joint 38 when the adapter is in position as shown in Figure 6. The cylindrical extension 44 has the integral tongues or projecting fingers 46 at both its ends which tongues or fingers are adapted to be bent over (as shown in Figures 3, 4 and 6) to rigidly hold the bulb 48 containing a heat sensitive fluid in the cylindrical extension 44. The flat portions 42 of the adapter are provided with the central opening 50 to permit the circulation of the water of the cooling system.

A member indicated as a whole at 52 is applied to the edges of the opening 50. The member is likewise of more or less hinge formation and has the bead 54 formed on either one of its sides as indicated at Figure 4. If desired, a similar bead may be provided on both sides. One side or leaf of the member 52 is passed through the opening 50 in the adapter as shown by the dotted outline 56 in Figure 4. The edges are then bent over to final position as indicated at 58. At one side, the annular member 52 is provided with the projecting portions 60 which extend in the same direction as the cylindrical portion 44 of the main portion of the adapter 40. The extensions 60 are curved or cylindrically formed at 62 to adapt them to fit onto the cylindrical portion 44 of the adapter and aid in transmitting heat to the bulb 48. As shown at the left hand portion of Figure 4, the adjacent edges of the annular member 52 are bent into overlapping relation at the edge of the opening 50 as indicated at 64.

The adapter has the lateral ears 66 provided with openings 68 adapted to receive the bolts 36. The edges of the adapter at the openings 68 are also provided with suitable beads 70 which are of substantially the same height as the bead 54.

Referring to Figure 4, it will be seen that the adapter at the cylindrical portion 44 is slightly spaced as indicated at 72. The purpose of this spacing is to cause the cylindrical portion 44 to tightly grip the bulb 48 when the adapter is in position as shown in Figure 6. The tightening of the bolts 36 will, of course, pinch the parts 42 together to close the space 72 and cause the cylindrical portion 44 to tightly hold the bulb 48.

Referring to the species shown in Figure 7, it will be seen that the adapter 40' has no annular member 52. The leaves or flat portions 42' have the beads 74 and 76 formed therein and at the opening 50 the lower leaf 42' has its edge 77 bent inwardly and over the edge of the upper leaf 42'. When the adapter 40' is applied similarly as shown in Figure 6, the beads 74 and 76 will flatten and form a tight joint.

The adapters 40 and 40' are preferably made of copper or other heat conducting material and are preferably formed of stamped metal. When the adapter is in final position as shown in Figure 6, it acts as a gasket as well as an adapter or holder for a thermostatic bulb and thereby eliminates the usual gasket applied at the joint 38.

Referring to the species shown in Figure 8, the adapter 40″ is formed of rubber. The adapter has the usual openings 68 to accommodate the bolts 36 and the central opening 50 will allow for the circulation of water. At one side of the central portion of the opening 50, a boss 78 is provided. In this boss there is adapted to be received the free end of the bulb 48. The adapter 40″, opposite the boss 78, is provided with an opening 80 and a cut or slit 82. By spreading the cut or slit 82, the opposite end of the bulb 48 may be inserted into the opening 80 to retain the bulb in position. When the adapter is applied to the joint and the bolts 36 screwed into position the rubber will rigidly hold the bulb in the adapter. This species has the advantage of having the bulb 48 in direct contact with the water of the water-cooling system of the engine.

I claim:

1. In combination with an internal combustion engine having a cooling system, an adapter comprising a folded metallic member having a retaining member formed therein, said adapter positioned at a joint in said system, and said retaining member adapted to receive a heat responsive member and to deliver heat thereto, said retaining member being positioned outside the joint and outside the cooling system.

2. In combination with an internal combustion engine having a cooling system, a gasket secured between a plurality of members forming a joint of said system, said gasket formed of a piece of metal folded upon itself to form a retaining section at the fold, said retaining section adapted to receive and hold a heat sensitive element and to deliver heat from said gasket to said element.

3. In an adapter for heat indicators of water circulating systems, a metallic member folded upon itself and having a water flow opening in its main portion, a retaining section formed at the fold of said member and adapted to receive a heat sensitive element, and means on said retaining section to hold said heat sensitive element.

4. In an adapter for heat indicators of water circulating systems, a metallic member having a flow opening with a bead therearound, said adapter forming a gasket, and an integral holder portion formed on said member and adapted to receive a heat sensitive element.

5. In an adapter for heat indicators of water circulating systems, a metallic member having a flow opening with a bead therearound, said adapter forming a gasket, an integral holder portion formed on said member and adapted to receive a heat sensitive element, and means on said holder portion to secure said element therein.

6. In an adapter for heat indicators of water circulating systems, a metallic member having a flow opening with a bead therearound, said adapter forming a gasket, an integral holder portion formed on said member and adapted to receive a heat sensitive element, and a plurality of fingers formed on said holder portion to secure said element therein.

In testimony whereof I affix my signature.
JOSEPH ZUBATY.

CERTIFICATE OF CORRECTION.

Patent No. 1,902,932. March 28, 1933.

JOSEPH ZUBATY.

It is hereby certified that error appears in the printed specification of the above numbered patent requiring correction as follows: Page 3, line 42, claim 2, after "element" insert the comma and words ", said retaining member being positioned outside the joint and outside the cooling system"; and that the said Letters Patent should be read with this correction therein that the same may conform to the record of the case in the Patent Office.

Signed and sealed this 23rd day of May, A. D. 1933.

M. J. Moore, (Seal) Acting Commissioner of Patents.